Figure 1:
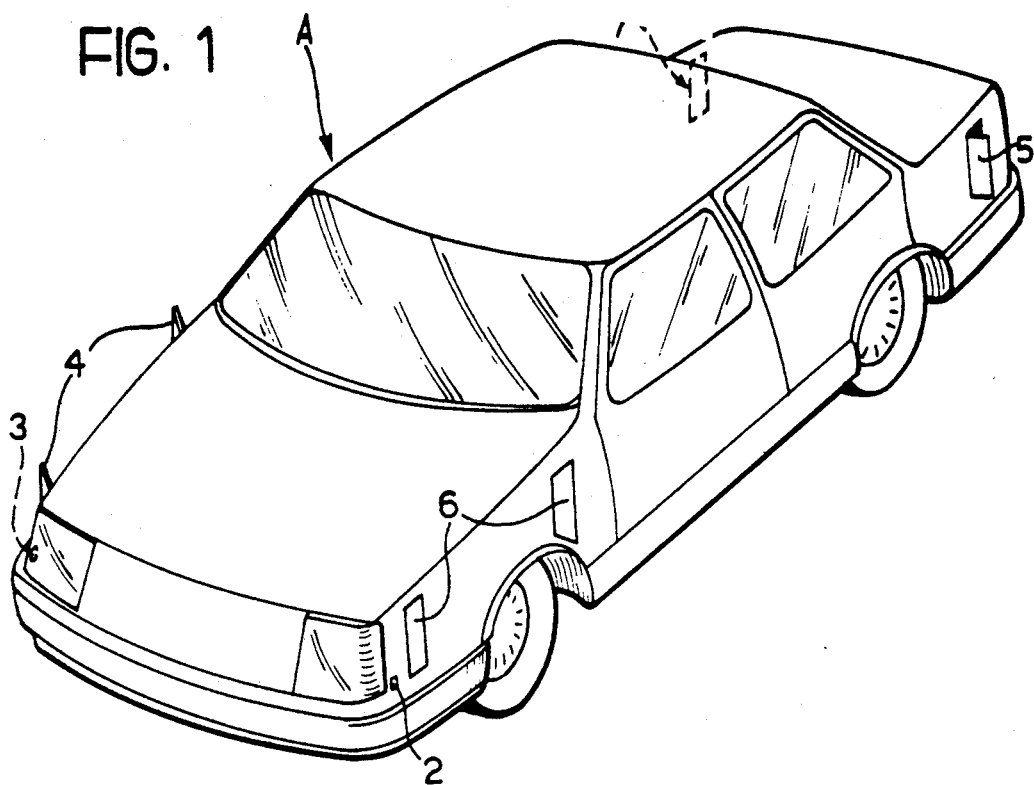

United States Patent [19]

Garrone et al.

[11] Patent Number: 5,013,080
[45] Date of Patent: May 7, 1991

[54] DEVICE FOR COMPENSATING FOR SLEWING INDUCED IN A MOVING MOTOR VEHICLE BY GUSTS OF CROSS-WIND

[75] Inventors: Angelo Garrone, Cascine Vica-Rivoli; Marco Masoero, Fiano, both of Italy

[73] Assignee: Fiat Auto S.p.A., Turin, Italy

[21] Appl. No.: 156,631

[22] Filed: Feb. 17, 1988

[30] Foreign Application Priority Data

Feb. 17, 1987 [IT] Italy .................. 67106 A/87

[51] Int. Cl.$^5$ .............................................. B62D 37/02
[52] U.S. Cl. ................................ 296/180.1; 296/180.5
[58] Field of Search ............ 296/1 S, 180.1, 180.5; 180/903; 244/76 C, 113, 30, 31

[56] References Cited

U.S. PATENT DOCUMENTS

| | | | |
|---|---|---|---|
| 2,498,064 | 2/1950 | Borell | 244/76 C |
| 2,621,873 | 12/1952 | Gordon | 244/76 C |
| 2,976,077 | 3/1961 | Totton, Jr. | 296/1 S |
| 2,985,409 | 5/1961 | Atwood et al. | 244/76 C |
| 4,591,113 | 5/1986 | Mabey | 244/76 C |

FOREIGN PATENT DOCUMENTS

| | | | |
|---|---|---|---|
| 2838998 | 3/1980 | Fed. Rep. of Germany | 180/903 |
| 67676 | 4/1986 | Japan | 296/180.1 |
| 234076 | 11/1986 | Japan | 296/180.5 |
| 146663 | 1/1961 | U.S.S.R. | 296/1 S |

Primary Examiner—Margaret A. Focarino
Assistant Examiner—Joseph D. Pape
Attorney, Agent, or Firm—Sughrue, Mion, Zinn, Macpeak & Seas

[57] ABSTRACT

Pressure sensors situated on opposite sides of a land motor vehicle relative to the direction of travel enable a signal to be generated which is indicative of the presence and the direction of a gust of cross-wind striking the vehicle. Flaps, which are connected to the sensors and are normally closed flush with the body, are movable to project selectively from the outer surface of the motor vehicle, in the event of a gust, to induce in the vehicle a slewing moment in the direction opposite the direction of the gust.

6 Claims, 1 Drawing Sheet

DEVICE FOR COMPENSATING FOR SLEWING INDUCED IN A MOVING MOTOR VEHICLE BY GUSTS OF CROSS-WIND

The present invention relates generally to the problem of compensating for slewing (yaw) induced in a moving motor vehicle by gusts of cross-wind which strike the vehicle.

These gusts exert a lateral aerodynamic force on the motor vehicle, and this is translated into a slewing moment. The latter tends to make the vehicle deviate from its straight line of travel. The intensity of the lateral forces and the slewing moments increase with the speed of travel of the motor vehicle and with the intensity of the gust.

The lighter the vehicle, the greater is the effect of the disturbances thus induced. In particular, in motor vehicles, especially of more recent manufacture, characterised by aerodynamic configurations which reduce resistance to forward movement, the aerodynamic characteristics of lateral stability are usually found to be inferior to those of past motor vehicles, and this makes the influence of gusts of cross-wind even more marked.

In principle at least, the slewing effect could be reduced by the use of vertical fins situated on the rear part of the motor vehicle, according to a solution which was once adopted by numerous designers during the '50s. As well as increasing the weight and cost of the motor vehicle and involving reduced visibility towards the rear part of the vehicle, a solution of this type would not be considered pleasing from the aesthetic point of view.

The requirement remains, however, to provide a structurally simple device which can be installed in mass-produced motor vehicles and is able to compensate for the slewing induced by gusts of cross-wind during travel.

The object of the present invention is to satisfy this requirement effectively.

According to the present invention, this object is achieved by virtue of a device for compensating for slewing induced in a motor vehicle moving in one direction by gusts of wind transverse that direction, characterised in that it includes:

pressure sensor means situated on opposite sides of the motor vehicle relative to the said direction and able to generate a signal indicative of the presence of a gust and of the direction of the gust, and flap means situated on the motor vehicle and able to induce in the moving motor vehicle slewing moments in opposite directions, the flap means being operatively connected to the sensor means so that, in the event of a gust, a slewing moment is induced in the vehicle in the opposite direction to the slewing induced by the gust.

The flap means preferably include at least two sets of flaps, one for each of the slewing directions; thus, each set includes:

at least one flap situated at the front end of the motor vehicle on one side of thereof, and at least one other flap situated at the rear end of the motor vehicle on the other side thereof.

Figure 2:
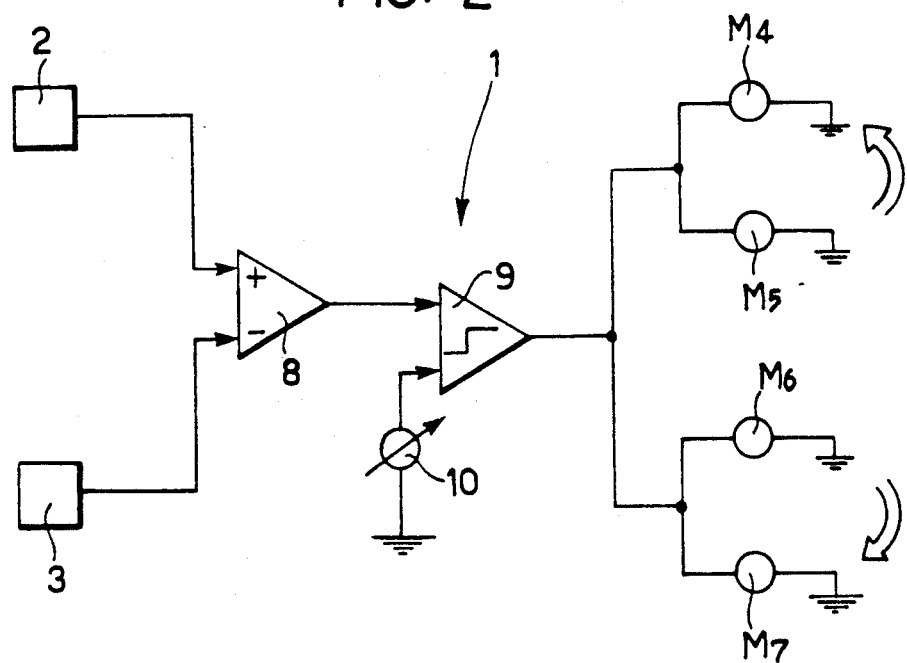

The invention will now be described, purely by way of non-limiting example, with reference to the appended drawings, in which:

FIG. 1 is a perspective view of a motor vehicle to which a device according to the invention is fitted, and FIG. 2 shows the general structure of the device according to the invention, in the form of a block diagram.

FIG. 1 schematically illustrates a motor vehicle, typically a car A, fitted with a device for compensating for slewing induced during travel by gusts of wind transverse the direction of travel.

The device, generally indicated 1, comprises two pressure sensors 2, 3 situated at the front end of the motor vehicle, usually near the front indicator units, and a set of flaps (acting as stabilizers or deflectors) indicated progressively from 4 to 7.

The sensors 2 and 3, which may be of any known type, are mounted on the motor vehicle A on opposite sides relative to the general direction of travel. The monitoring signals produced by these when travelling, and transmitted to the input of a differential amplifier 8, thus enable a signal to be obtained at the output of the differential amplifier 8, the intensity of which is indicative of any pressure increases or gradients existing between the two sides of the motor vehicle and the sign of which is indicative of the direction of the pressure increase or gradient.

Consequently, when the motor vehicle is moving, the signal output by the amplifier 8 is indicative of the presence and direction (from the right or from the left) of gusts of wind which strike transverse the vehicle. Those gusts whose effect is to induce a slewing movement in the motor vehicle from right to left or from left to right may be identified as gusts coming from the right or from the left, respectively.

The flaps 4 to 7 are able to project selectively from the outer surface of the motor vehicle in dependence on an orienting movement caused by respective actuating motors $M_4$, $M_5$, $M_6$ and $M_7$.

The motors in question may be constituted, for example, by motors of the type used to move the concealed front light units fitted to some models of sports cars.

In particular, the reference numerals 4 and 6 indicate two pairs of flaps mounted at the front end of the wing and near the rear edge of the wheel arch.

The reference numerals 5 and 7, on the other hand, indicate flaps situated at the rear end of the motor vehicle, usually immediately in front of the rear light units.

The arrangement of the connections of the motors $M_4 \ldots M_7$ is such that the flaps 4 to 7 are divided, as far as their operation is concerned, into two sets arranged approximately o the diagonals of the motor vehicle.

The two sets in question are constituted respectively:

by the flaps 4 situated at the front end and on the right-hand side, together with the flap 5 situated at the rear end on the left-hand side of the motor vehicle, and by the flaps 6 situated at the front end and on the left-hand side, together with the flap 7 situated at the rear end on the right-hand side of the motor vehicle.

The motors $M_4 \ldots M_7$ which control the flaps of the two sets are operated alternatively.

In particular, by activation of the motors $M_4$ and $M_5$ which cause the flaps 4 and 5 of the first set to project outwardly of the motor vehicle, it is possible to induce in the moving vehicle (due to the aerodynamic thrust exerted on the flaps by the relative wind) a slewing movement from right to left.

Conversely, by activation of the motors $M_6$ and $M_7$ which cause the projection of the flaps 6 and 7 of the other set, it is possible to induce in the motor vehicle a slewing movement from left to right.

The motors $M_4 \ldots M_7$ are connected to the output of the differential amplifier 8, as shown schematically in FIG. 2, so that:

when the signal output by the differential amplifier 8 indicates that the moving motor vehicle is being struck by a gust of wind from the left, which tends to induce in the motor vehicle a slewing movement from left to right, the motors $M_4$ and $M_5$ are activated with consequent opening of the flaps 4 and 5 which induce in the motor vehicle a slewing movement from right to left that compensates for, or at least considerably reduces, the slewing induced by the gust of wind; and when the signal output by the differential amplifier indicates that the motor vehicle is being struck by a gust from the right, which tends to induce slewing of the motor vehicle from right to left, the motors $M_6$ and $M_7$ are activated with consequent opening of the flaps 6 and 7 which induce in the motor vehicle a slewing movement from left to right that compensates for, or at least considerably reduces, the slewing induced by the gust of wind.

The movement of the motors $M_4 \ldots M_7$, and thus the amplitude of the projection of the flaps controlled thereby, is related to the intensity of the signal emitted by the differential amplifier 8 so that, with a precise adjustment of the gain of the amplifier carried out experimentally in dependence on the overall aerodynamic characteristics of the motor vehicle, it is possible to obtain an exact compensation for the slewing induced by transverse gusts.

Preferably, a comparator circuit 9 having a selectively adjustable operating threshold, as schematically indicated 10 in FIG. 2, is inserted between the output of the differential amplifier 8 and the control inputs of the motors $M_4 \ldots M_7$.

It is possible, by adjustment of the operating threshold of the circuit 9, to establish a zero-centred range of amplitudes $\pm \Delta V$ of the signal output by the amplifier 8, so that the flaps 4 to 7 are only operated in the presence of gusts of wind having a certain intensity. In other words, the motors $M_4 \ldots M_7$ are only activated when the modulus of the amplitude of the signal emitted by the differential amplifier 8 is greater than the selected threshold of the circuit 9.

Naturally, the device will be arranged for possible disengagement by the driver. With respect to the requirements of safety standards, the flaps 4 to 7 may be made of soft material, such as plastics or rubber.

We claim:

1. A device for compensating for slewing induced in a land motor vehicle moving in one direction by gusts of wind transverse that direction, including:

pressure sensor means arranged on opposite sides of the land motor vehicle relative to the said direction and able to generate a signal which is indicative of the presence of a gust and of the direction of the gust, and flap means movably mounted on opposite sides of the motor vehicle and able to induce in the moving land motor vehicle slewing movements in opposite directions, the flap means being operatively connected to the sensor means so that, in the event of a gust, a slewing movement is induced in the moving land motor vehicle in the opposite direction to the slewing induced by the gust.

2. A device according to claim 1, wherein the pressure sensor means are situated adjacent the front end of the motor vehicle.

3. A device according to claim 1, wherein the flap means include flaps which are able to project selectively from the outer surface of the motor vehicle sides.

4. A device according to claim 1, wherein the flap means include at least two sets of flaps, one set for each of the slewing directions, and each set includes:

at least one flap situated at the front end of the motor vehicle on one side thereof, and at least one other flap situated at the rear end of the motor vehicle on the other side thereof.

5. A device according to claim 4, wherein each set includes a pair of flaps situated at the front end of the motor vehicle.

6. A device according to claim 1, wherein a threshold circuit is interposed between the sensor means and the flap means and is able to prevent activation of the flap means when the modulus of the amplitude of the signal generated by the sensor means is less than the threshold.

* * * * *